United States Patent
Eichenlaub et al.

[11] Patent Number: 5,897,184
[45] Date of Patent: Apr. 27, 1999

[54] REDUCED-THICKNESS BACKLIGHTER FOR AUTOSTEREOSCOPIC DISPLAY AND DISPLAY USING THE BACKLIGHTER

[75] Inventors: Jesse B Eichenlaub, Penfield, N.Y.; Russell W Gruhlke, Mt. Vernon, Ohio

[73] Assignee: Dimension Technologies, Inc., Rochester, N.Y.

[21] Appl. No.: 08/674,468

[22] Filed: Jul. 2, 1996

[51] Int. Cl.⁶ .................................................. G02F 1/1335
[52] U.S. Cl. ................................................ 349/64; 349/66
[58] Field of Search ................................. 349/62, 65, 66

[56] References Cited

U.S. PATENT DOCUMENTS

| | | |
|---|---|---|
| 1,515,427 | 11/1924 | Bouin . |
| 2,522,812 | 9/1950 | Bonnett . |
| 3,184,630 | 5/1965 | Geer . |
| 3,365,350 | 1/1968 | Cahn . |
| 3,688,045 | 8/1972 | Onkoshi . |
| 3,893,748 | 7/1975 | De Palma et al. . |
| 4,717,949 | 1/1988 | Eichenlaub . |
| 4,772,094 | 9/1988 | Sherman . |
| 4,807,965 | 2/1989 | Garakani . |
| 4,829,365 | 5/1989 | Eichenlaub . |
| 5,036,385 | 7/1991 | Eichenlaub . |
| 5,040,878 | 8/1991 | Eichenlaub . |
| 5,126,882 | 6/1992 | Oe et al. ................................ 359/619 |
| 5,339,179 | 8/1994 | Rudisill et al. .......................... 359/49 |
| 5,359,691 | 10/1994 | Tai et al. ................................. 385/146 |
| 5,457,574 | 10/1995 | Eichenlaub . |
| 5,485,291 | 1/1996 | Qiao et al. ............................... 349/62 |
| 5,712,694 | 1/1998 | Taira et al. .............................. 349/62 |

*Primary Examiner*—William L. Sikes
*Assistant Examiner*—James Dudek
*Attorney, Agent, or Firm*—Cumpston & Shaw

[57] ABSTRACT

A reduced-thickness backlighter for an autostereoscopic display is disclosed having a lightguide and at least one light source parallel to an edge of the lightguide so as to be substantially coplanar with the lightguide. The lightguide is provided with a first surface which has a plurality of reflective linear regions, such as elongated grooves or glossy lines, parallel to the illuminated edge of the lightguide. Preferably the lightguide further has a second surface which has a plurality of lenticular lenses for reimaging the reflected light from the linear regions into a series of thin vertical lines outside the guide. Because of the reduced thickness of the backlighter system, autostereoscopic viewing is enabled in applications requiring thin backlighter systems. In addition to taking up less space, the reduced-thickness backlighter uses less lamps and less power. For accommodating 2-D applications, a 2-D diffuser plate or a 2-D lightguide parallel to the 3-D backlighter is disclosed for switching back and forth between 3-D viewing and 2-D viewing.

45 Claims, 7 Drawing Sheets

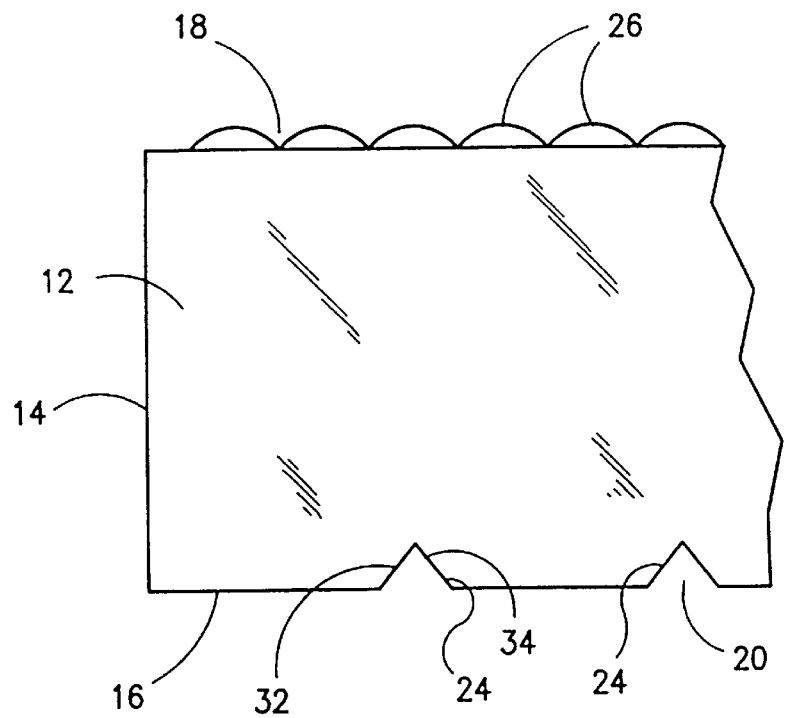
FIG. 3
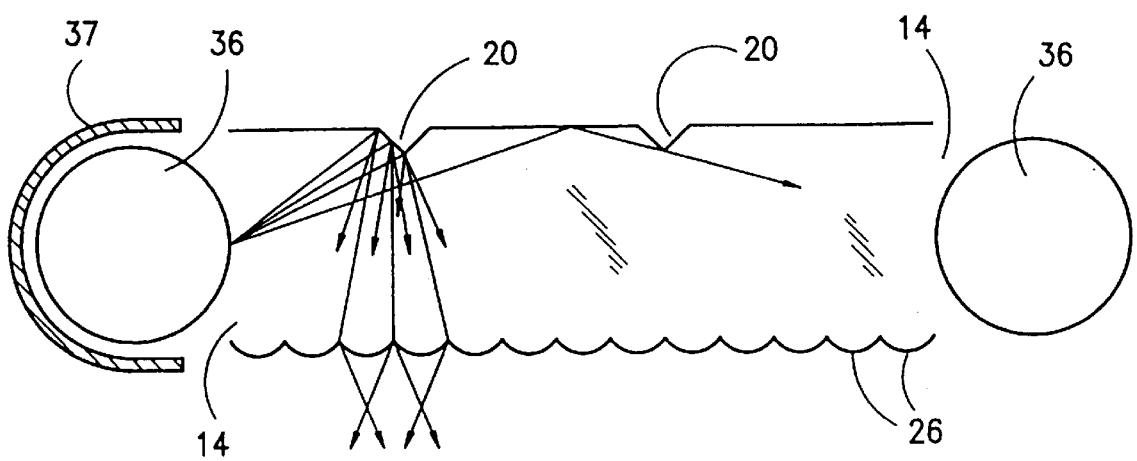
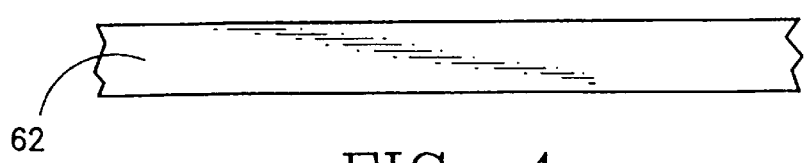
FIG. 4

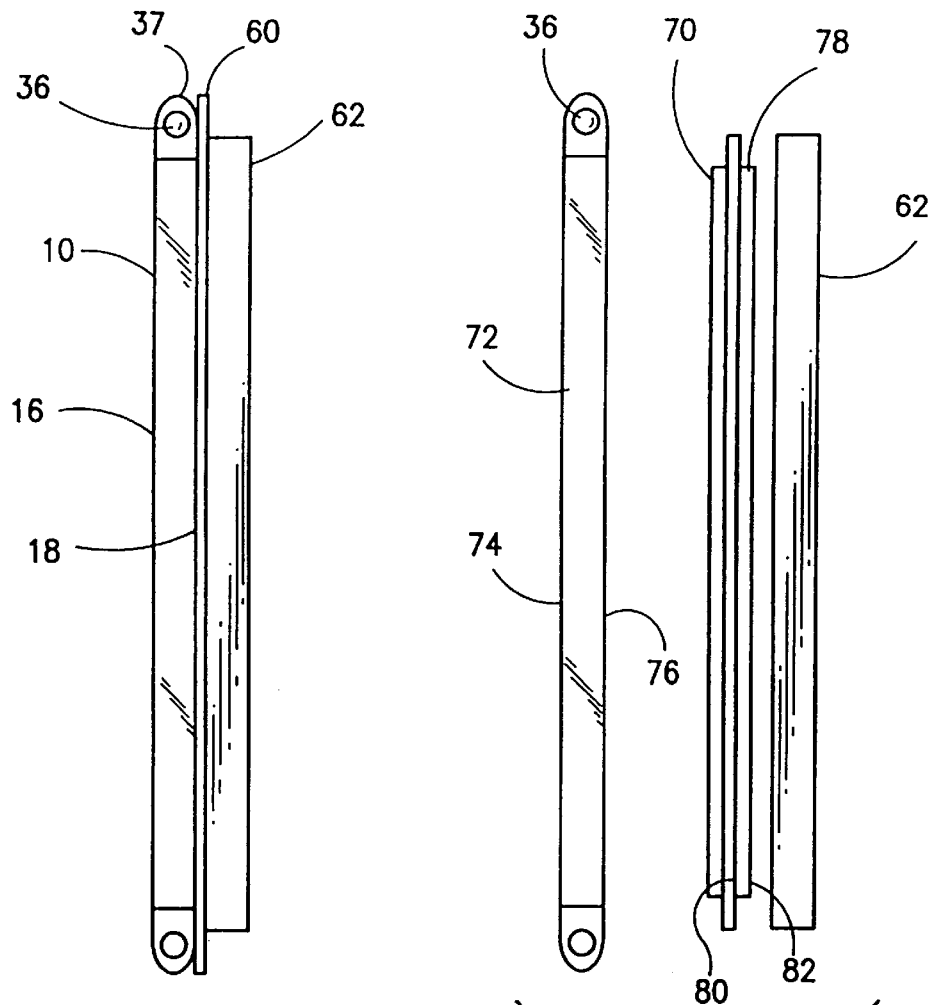

ized grooves or glossy white lines, on one surface.
REDUCED-THICKNESS BACKLIGHTER FOR AUTOSTEREOSCOPIC DISPLAY AND DISPLAY USING THE BACKLIGHTER This invention was made with Government support under contract number NAS2-14227 awarded by NASA. The Government has certain rights to the invention.

FIELD OF THE INVENTION

This invention relates to a flat screen autostereoscopic device for use in television, computer graphics, and similar viewing applications, and more particularly to backlight illumination devices of reduced thickness for 2D and 3D displays.

BACKGROUND OF THE INVENTION

U.S. Pat. Nos. 4,717,949, 4,829,365, 5,036,385, 5,040,878, and 5,457,574 disclose autostereoscopic display devices with an array of thin, vertical, parallel, equidistant, light emitting lines behind a flat, transmissive, electronically controlled display panel, such as a liquid crystal display (LCD), to generate for an observer a perception of three dimensional images. These patents describe various means for generating an array of thin lightlines as the means for creating stereoscopic images, however they all utilize light sources which are not coplanar with their lightguides. The backlighters described in these prior patents vary in cost and complexity, but they all share the disadvantage of having backlighters which are too thick for some of today's applications, such as lap top computers, and which consume more power than is desirable, especially for battery operated devices.

Planar or edge-lit backlighters are known in the prior art such as shown in U.S. Pat. Nos. 5,126,882, 5,339,179, and 5,359,691. These types of backlighters are useful in lap top computers and the like, however none of these patents disclose how to incorporate autostereoscopic technology into planar backlighters. Therefore, there is a need for a simple, low cost autostereoscopic system capable of providing clear, bright, high resolution images with a relatively thin planar back lighting system as is necessary for use in today's thin portable computer systems, televisions, and other electronic display devices. There is also a need to provide a planar back lighting system with the capability of switching back and forth from 3-D to 2-D images. There is further the need to provide an autostereoscopic system of smaller size, which uses less lamps and less power, takes up less space, and is less expensive to produce than existing systems.

SUMMARY OF THE INVENTION

In accordance with this invention there is provided in an autostereoscopic display unit a backlighter for illuminating the backside of flat panel displays, the improvement which comprises a lightguide and at least one light source parallel to an edge of the lightguide. The lightguide is a light transmissive slab, typically, a clear rectangular substrate plate, with microstructures on either surface. The microstructures are designed to reflect light entering at least one, and preferably two, edges of the plate across the thickness of the lightguide from reflective linear regions, such as aluminized grooves or glossy white lines, on one surface. The light is then reimaged into a series of thin vertical lines outside the guide by lenticular lenses on the other surface. There is a plurality of these linear regions on the first surface of the lightguide and they are spaced evenly across the entire surface. The linear regions preferably all have about the same length. When grooves are utilized, however, the grooves will have different depths and different tilt positions depending on what position they occupy on the lightguide. The grooves may have planar reflecting surfaces and be provided with a surface roughness so that light reflecting off them is scattered, thus spreading the light out more evenly in front of the display where an observer is sitting. Alternatively, the grooves may have bowed, curved, multi-faceted flat, or multi-faceted curved reflecting surfaces to spread the light out more evenly in front of the display. When glossy white lines are utilized, light entering at least one edge of the plate may be reflected forward from the glossy lines printed or otherwise disposed on the first surface of the plate. The glossy lines may be coated with a reflective coating on their rear surfaces so that any light leaking out the rear of the lines is reflected back into the guide. The lenticular lenses on the second surface of the lightguide are oriented parallel to both the grooves or glossy lines and the illuminated edge of the lightguide. The dimensions of the lenticular lenses are substantially equal throughout the second surface. There are preferably more lenticular lenses located on the second surface than there are grooves or glossy lines on the first surface. Parallel to the lightguide and between the lightguide and the flat panel display, there may be a stationary 2-D diffuser plate which is transparent when 3-D viewing is desired and diffuse when 2-D viewing is desired. Alternatively, the 2-D diffuser plate may have several sections that can be independently controlled, with each section capable of becoming diffuse or transparent independently of the others so that one can cause some sections of the display to display 3D images and some sections to display 2D images. In another embodiment, a conventional 2-D planar backlighter may be employed in conjunction with and parallel to the 3-D backlighter of the present invention and means can be provided for switching the illumination to the desired viewing format. An autostereoscopic display unit according to this invention can thus be made wherein the thickness of the backlighter is between 3.5 and 11.5 millimeters as opposed to approximately 90 millimeters for a prior art 3-D backlighter.

BRIEF DESCRIPTION OF THE DRAWINGS

FIG. 3 is a cross-sectional view of the lightguide of FIG. 1.

FIG. 4 illustrates the geometry and optical characteristics of the invention when viewing the top of the display unit.

FIG. 9 is a top view of one embodiment for illuminating three dimensional displays of the present invention with the possibility of alternating back and forth between 3-D and 2-D displays.

FIG. 10 is a top view of an alternate embodiment for illuminating three dimensional displays of the present invention with the possibility of alternating back and forth between 3-D and 2-D displays.

FIG. 11 illustrates a plan view of one embodiment of a variable diffuser for enabling a 3-D display of the present invention to display segments in 2-D.

DETAILED DESCRIPTION OF THE INVENTION

Figure 1:
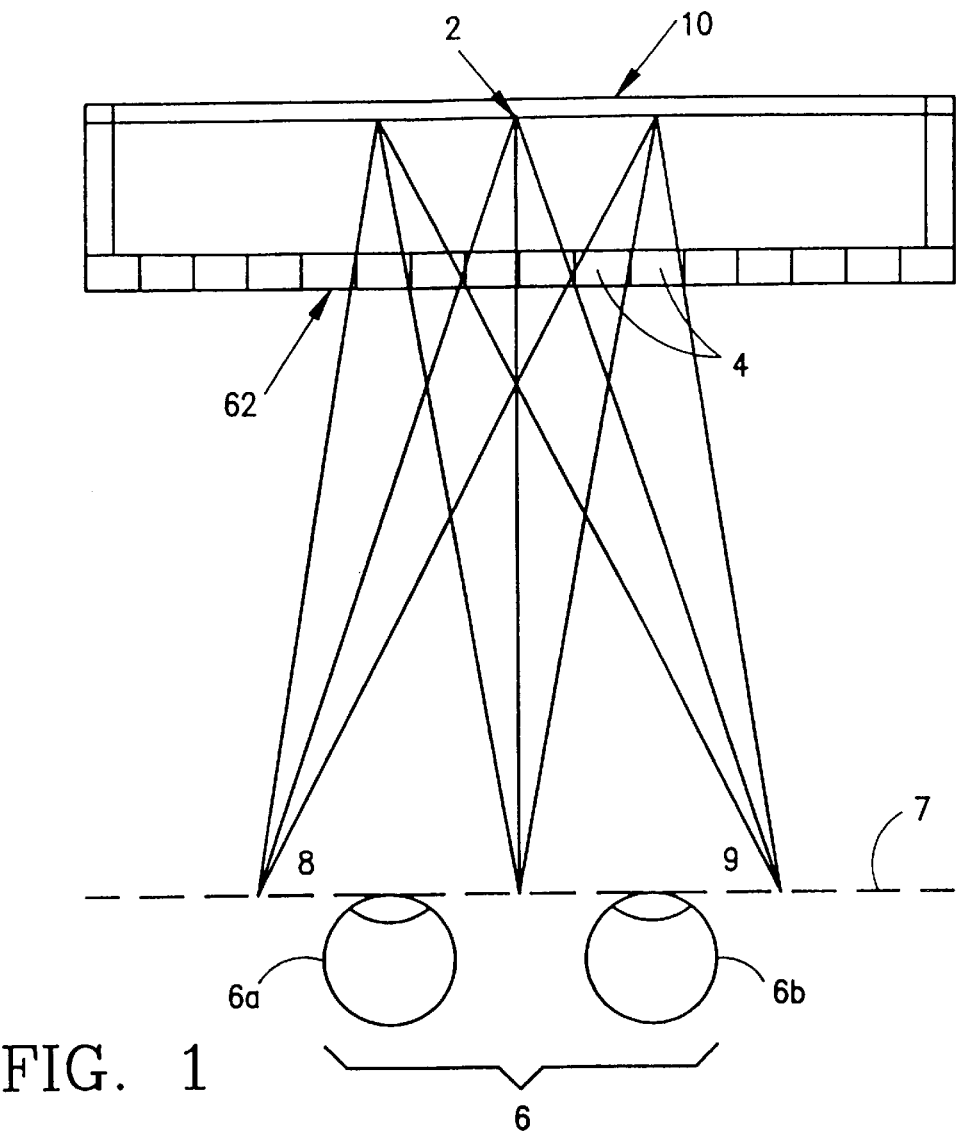
FIG. 1 is a top view of an autostereoscopic display employing a light valve and vertical light emitting lines.

FIG. 1 an autostereoscopic display according to the invention. A transmissive light valve display 62, such as a liquid crystal display (LCD), is situated in front of and spaced apart from an illuminating lightguide 10 which produces on a surface a large number of thin, bright, parallel vertical light lines 2. There is at least one light line 2 for every pair of pixel columns 4 in the transmissive display 62. The light lines 2 are spaced apart from each other and from the transmissive display 62 at such a distance that an observer 6 seated at some viewing distance directly in front of the transmissive display 62 screen, sees all of these lines through the odd numbered columns of pixels 4 with his or her left eye 6a and all of the lines through the even numbered columns of pixels 4 with his or her right eye 6b. Thus, the left eye 6a sees only what is displayed on the odd columns of pixels 4, and the right eye 6b sees only what is displayed on the even columns of pixels 4. If the left eye 6a view of a stereoscopic image pair is displayed on the odd columns and a right eye 6b view on the even columns, a stereoscopic image with apparent depth is perceived by the observer 6. The observer 6 will see the correct left eye 6a and right eye 6b images as long as his or her eyes are near an ideal viewing plane 7 and within certain viewing zones 8 and 9 whose boundaries are defined by lines running from the light lines 2 through the pixel column 4 boundaries, as shown in FIG. 1.

Figure 2:
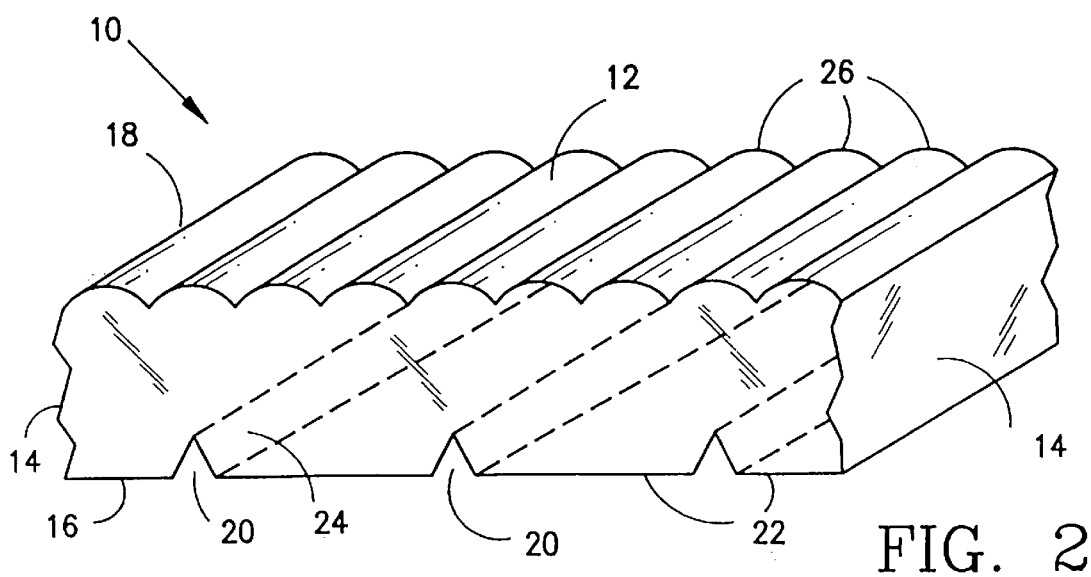
FIG. 2 is a perspective magnified view of a backlighter for an autostereoscopic display unit of this invention showing the microstructures on the first and second surfaces of the lightguide.

FIG. 2 illustrates the lightguide in one embodiment of the present invention. The lightguide 10 may be a light transmissive, preferably clear rectangular substrate plate as shown by light transmissive slab 12. The slab 12 may be made from any light transmissive material, such as glass or fused silica, or any other known material such as plastics or any other light transmissive or at least partially light transmissive material. The slab 12 includes four edges which may be illuminated, however the slab shall include at least one illuminated edge shown generally at 14, and preferably includes two opposing illuminated edges. The slab further includes two parallel opposed surfaces, a first surface 16 and a second surface 18.

The first surface 16 has a plurality of thin preferably evenly spaced grooves formed in or on the surface of the lightguide and preferably parallel to the short dimension of the guide and the illuminated edge 14. As shown in FIG. 2, the grooves 20 are separated by spaces shown as land areas or flat surfaces 22. The grooves 20 each have elongated reflecting surfaces 24. Although the grooves 20 each have the same length, the other dimensions of the grooves, such as the depth into the lightguide, the width it takes up on the lightguide surface 16, and the widths and shapes of its reflecting surfaces, may vary depending on what position the grooves 20 occupy on the surface 16 of the lightguide 10. Light transmitted from illuminated edge 14 will reflect off elongated reflecting surfaces 24 of the grooves 20 and will bounce off towards the second surface 18.

As can also be seen in FIG. 2, the second surface 18 of the light transmissive slab 12 has a plurality of lenticular lenses 26. The lenses 26 preferably cover the entire second surface 18 of the lightguide 10 except for a very small border area on each side. The lenticular lenses 26 are present on the surface of the lightguide opposite the grooves 20. The lenticular lenses 26 are oriented parallel to both the grooves 20 and the short sides of the lightguide corresponding to the illuminated edge 14. The dimensions of the lenticular lenses 26 preferably do not vary substantially across the entire surface 18, in other words, they should remain constant other than a small tolerance factor.

The lenticular lenses 26 and the grooves 20, which may each be referred to collectively as microstructures, may be fabricated directly into the light transmissive slab 12, or they may be contained in a layer such as plastic or epoxy bonded or otherwise attached to the slab 12.

Turning to FIG. 3 it can be seen that there is not a 1 to 1 correspondence between the grooves 20 and the lenticular lenses 26. There should usually be more lenticular lenses 26 than there are grooves 20. As can be seen in FIG. 3, there are at least three times as many lenticular lenses 26 as there are grooves 20, however the dimensions of these figures are not to scale and should therefore not be construed as limiting. Each groove 20 is provided with two side walls, a first side wall 32 and a second side wall 34. If both edges 14 are illuminated by light sources 36 (shown in FIG. 4), both reflecting surfaces 32 and 34 of each groove 20 will reflect light from the illuminated edges 14 towards the lenticular lenses 26. The reflecting surfaces 32 and 34 are preferably provided with a reflective coating, such as aluminum or silver, while the land areas or flat surfaces 22 between the grooves 20 are not provided with a reflective coating, e.g. the flat surfaces 22 may be left light transmissive. Alternatively, the reflecting surfaces 32 and 34 may be coated with a diffuse material such as diffuse silver, ink, or paint.

As can be seen in FIG. 4, the lightguide 10 will receive light from either or both light sources 36. The light sources are preferably fluorescent and cylindrical, although alternate embodiments may be accommodated. The light sources are generally coplanar with the lightguide 10, meaning that the central axes of the light sources preferably lies within the same plane as a plane dividing the thickness of the lightguide 10. Also, the diameter of the light sources and the thickness of the lightguide 10 may be substantially equal. The light may be directed towards the edges 14 by appropriate reflectors 37, also preferably coplanar with the lightguide 10 so as not to enlarge the thickness of the backlighting system of the present invention. The reflectors may, for example, comprise reflecting tape. Light from the light source 36 will be captured by the light transmissive slab 12 of the lightguide 10 by refraction at the end faces, will reflect off the reflecting surfaces 32 and 34, and will be directed by the reflecting surfaces 24 towards the lenticular lenses 26. By total internal reflection, light rays, not striking the micro structures, propagate in the slab 12. Rays traveling internally in the lightguide and striking the grooves 20 are reflected across the thickness of the slab towards the second surface 18. The lenticular lenses 26 collect this light and focus it to lines outside the lightguide, as at the intersection of the rays in FIG. 4. Preferably, the lines are all of the same intensity, and the intensity of the light lines is uniform along the length of the lines. Thus each groove is a light source that is relayed to strips outside the lightguide. As can be seen, the lightguide will create multiple thin vertical light emitting lines when the guide is illuminated through one or two sides. The lines are spaced apart from each other and the transmissive display, or LCD, pixels according to a very precise geometry, which is dependent upon the horizontal pitch of the LCD pixels and the desired viewing zone width and distance.

The required pitch of the light line images formed by the lenticular lenses 26 can be expressed by the formula:

$$s=2/[1/n-1/z],$$

where s is the pitch of the light lines, n is the width of a single pixel (or color pixel element in the case of a vertical stripe color display), and z is the maximum viewing zone width, which is usually set equal to the average interpupillary distance between human eyes, about 63 mm.

Given this required pitch, the relationship between the pitch of the grooves 20 (or other light reflecting, scattering, or emitting elements), and the pitch of the lenticular lenses 26 is given by:

$$a=1/[1/L-1/s],$$

where a is the pitch (center to center distance) of the lenses 26,

L is the pitch (center to center distance) of the grooves 20, and s is the required pitch of the light lines.

Given that the above relationship holds, the relationship between the focal length of the lenses and the distance between the front of the lenses and the grooves (taking the refractive index of the light guide material into account) is given by:

$$D=(f/a) \times L,$$

where

D is the distance between the grooves 20 and the lenses 26, f is the focal length of the lenses 26, a is the pitch of the lenses 26 as given above, and L is the pitch of the grooves 20 as given above.

These conditions provide a correct light line pitch and also ensure that light lines formed by each lens 26 are superimposed on the light lines formed by adjacent lenses 26.

The thin light lines created by the apparatus with dark spaces in between are necessary for autostereoscopic viewing. The geometry of this lightguide is important for accomplishing this autostereoscopic feature. For example, if the grooves were not spaced apart at least five times their width, the lightlines shown would be wider than desirable and thus would decrease the 3-D effect. Also, for example, the depths of the grooves are important because otherwise the lines at the edges would be brighter than the lines at the center, as discussed in more detail below.

Figure 5A:
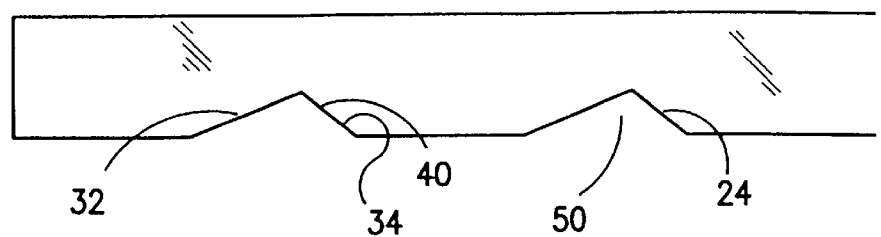
FIGS. 5A–5C illustrate the different dimensions of the grooves depending on their location on the lightguide in one embodiment of the invention.
Figure 5B:
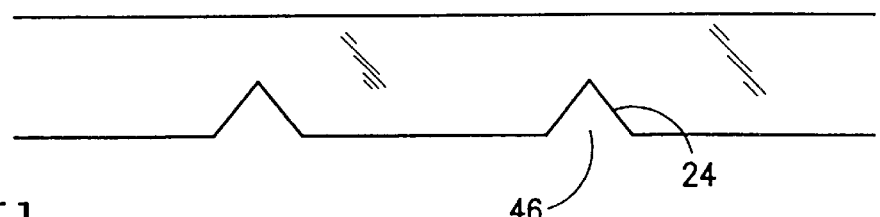
Figure 5C:
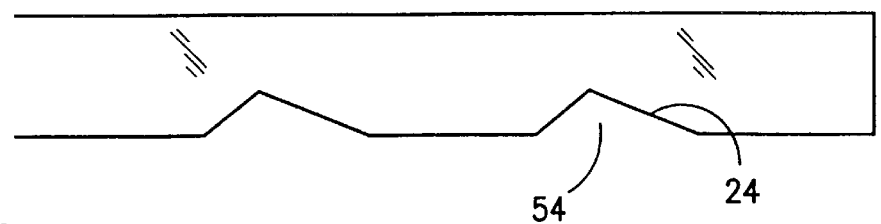
Figure 6A:
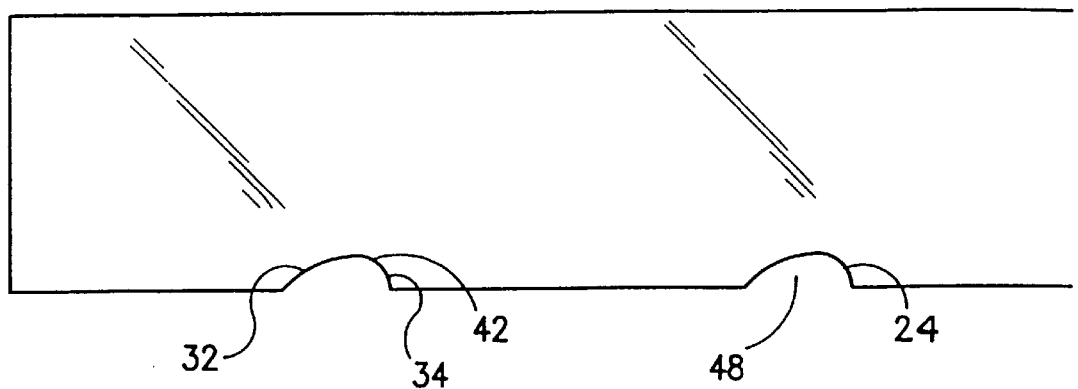
FIGS. 6A–6C illustrate the different dimensions of the grooves depending on their location on the lightguide in another embodiment of the invention.
Figure 6B:
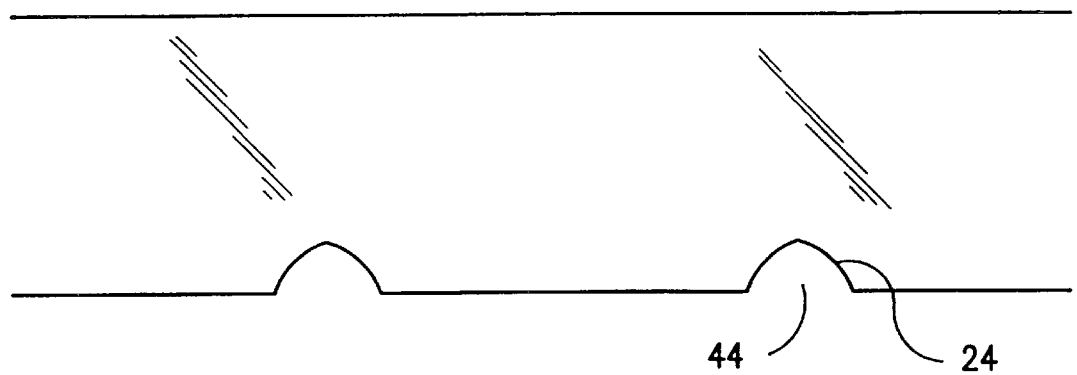
Figure 6C:
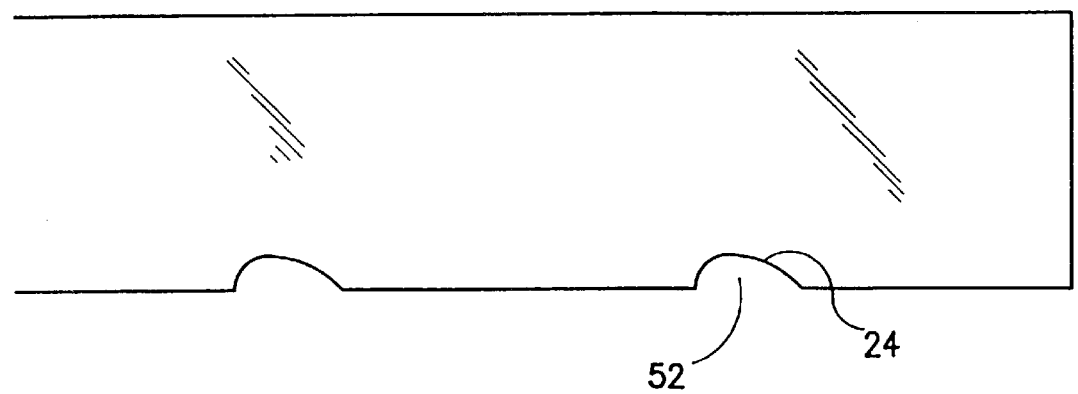

FIGS. 5A–5C show that the elongated reflecting surfaces 24 may be planar reflecting surfaces 40. The planar reflecting surfaces may be rough for spreading light out more evenly in front of the display, approximately where an observer would sit. Alternatively, in another embodiment of the invention, FIGS. 6A–6C illustrate that the elongated reflecting surfaces 24 may be curved or bowed reflecting surfaces 42, although the cross-section of the grooves shown in FIGS. 6A–6C is still roughly triangular in shape. The curvature of the reflecting surfaces 42 serves to spread light out more evenly in front of the display, approximately where an observer would sit, in a more controlled manner than the rough planar reflecting surfaces 40. An alternative method of and device for spreading light out more evenly in front of the display would be to make each reflecting surface 24 a multi-faceted surface, i.e. have more than one planar or curved secondary surface per reflecting surface 24.

Both FIGS. 5A–5C and 6A–6C show embodiments of the invention in which the grooves 20 have different dimensions depending on their location within the first surface 16 of the light transmissive slab 12. In particular, the grooves in the center portion of the first surface 16 have reflecting surfaces 24 which are equal in length, as shown in FIGS. 5b and 6b. Grooves located on a left side portion of the first surface 16, such as grooves 48 and 50, will have left reflecting surfaces which are longer than their right reflecting surfaces. Likewise, grooves 20 located on the right side area of the first surface 16, such as grooves 52 and 54, will have right reflecting surfaces which are longer than their left reflecting surfaces. In addition, as can be seen in FIGS. 5A–5C and 6A–6C the depths of the grooves vary according to their location within the first surface 16. In particular the center grooves 44 and 46 will have the greatest or deepest depth within the first surface 16. The grooves located on the right most and the left most edges of the first surface, will have the least or most shallow depths. The purpose for varying the dimensions of the grooves depending on their location on the first surface 16 is to insure that the brightness of the light reflected from the illuminated edges 14 will be even across the second surface 18. If the grooves 20 were of equal dimensions throughout the first surface 16 the edges of the second surface 18 would receive a greater amount of light and would thus be brighter than the central area of the second surface 18.

Following are measurements for a preferred embodiment of this invention when utilized with an LCD having a 31 centimeter diagonal with a 0.08 millimeter horizontal pixel element pitch and 1024×768 resolution. Of course, the measurements of the lightguide of this invention could obviously be altered to accommodate differently sized LCD's. The lightguide 10 for a preferred embodiment of this invention, when used with the above described LCD, is made of a light transmissive slab 12 having the dimensions of 247 millimeters +/–1 millimeter for the length, 186 millimeters +/–1 millimeter for the width (corresponding to the length of illuminated edge 14), and 4 millimeters +/–0.05 millimeters for the thickness. There may be 274 thin grooves evenly spaced across the first surface 16. The grooves may be 186 millimeters +/–1 millimeter long and will, as discussed previously, have different depths depending on what position the grooves are in on the lightguide. The center most grooves may have a depth of 0.09 millimeters +/–0.009 millimeters. The edge grooves, either on the right side or the left side, may have a depth of 0.015 millimeters +/–0.0015 millimeters, and the depth of the grooves may vary between the lowest and the highest value depending on the groove's distance from the edge. As also previously discussed, the tilt of the grooves may vary according to groove position. The two central grooves may be symmetrical, with each side making an angle of 43° with the surface of the lightguide.

The two edge grooves may be tilted so that the sides closest to the edge make an angle of 29+/−1 degree with the surface, and the sides away from the edge make an angle of 57+/−1 degrees with the surface. The angle of tilt will vary from the lowest to the highest value depending upon the distance of each groove from the center. Note, however, that the angle at the tip of the groove remains constant at 94 degrees. The surfaces of the grooves may be sufficiently rough such that light reflecting off them is scattered with a half maximum width of at least +/−9 degrees from the direction of specular reflection. Although ideally constant, the width of any single groove may vary by no more than one-tenth its average width along its length. The angle between the groove reflecting surfaces may be a constant 94 degrees +/−0.5 degrees. The surface of the grooves may be aluminized so as to reflect light with no more than a +/−5% reflectance variation. The surface area (land area or flat surface 22) between the grooves may not be aluminized. The grooves may have an average pitch of 0.9 millimeters. No point on the left edge of the nth groove from the left may deviate from its ideal position by more than +/−0.045 millimeters, where the ideal position is defined as a vertical line situated at a distance (N−1)×0.9 millimeters from the left edge of the left most light emitting region, as measured along lines running perpendicular to the center line of the left most light emitting region. 1,831 lenticular lenses may be present on the side of the lightguide opposite the grooves. The lenticular lenses may be oriented parallel to both the grooves and the short sides of the lightguide. The lenticular lenses may cover the second surface of the lightguide, except for a very small border area on each side. Each lens may have a length of 186 millimeters +/−1 millimeter and a width of 0.13483 millimeters +/−0.01 millimeters. The transmittance of the lenses may vary by no more than 5% across their surface. The lenses may have an average pitch of 0.13483 millimeters. No point on the center line of the nth lens from the left may deviate from its ideal position by more than +/−0.007 millimeters, where the ideal position is defined as a vertical line situated at a distance (N−1)×0.13484 millimeters from the center line of the left most lens, as measured along lines running perpendicular to the center line of the left most lens. The lens may have a focal length of 0.4 millimeters +/−0.04 millimeters. The lens may be aligned parallel to the grooves to within +/−5 minutes of arc.

The thickness of the light transmissive slab 12 of the lightguide 10 may be 4 millimeters +/−0.1 millimeter. The surfaces of the substrate may not deviate from two ideal parallel planes by more than +/−0.025 millimeters. The lightguide 10 may weigh no more than 0.5 kilograms. The lightguide may be manufactured from clear materials without tinting or other discoloration. The apparent luminance seen within areas on the surface of the lightguide between the grooves, due to stray light leaking from the system through these areas due to scratches, surface roughness, and other blemishes, may be no more than 0.5% of the luminance within the light emitting lines. The lightguide may be designed to transmit white light with peaks in the red, green, and blue spectral regions without noticeably changing the color coordinate of such white light due to filtering of the various colors. Blemishes and discolorations may not be visible when the lightguide is viewed with the naked eye from a distance of 53 centimeters.

The lightguide and the materials used to create the light lines should be capable of operating reliably for 10,000 hours MTBF (mean time between failure) without degradation in transmittance or discoloration over that period, while being illuminated by fluorescent lamps along one or more sides, and under use conditions typically associated with portable computer display illumination systems. Preferably the light sources used are cylindrical fluorescent bulbs having a diameter of approximately 2 mm and not greater than 5 mm. Because the preferred embodiment of the present invention utilizes only two light sources, the chances for failure are decreased thus increasing the lifespan of the backlighter. In addition, the backlighter requires less power to run itself because of the limited amount of light sources needed to effectively operate.

Figure 7:
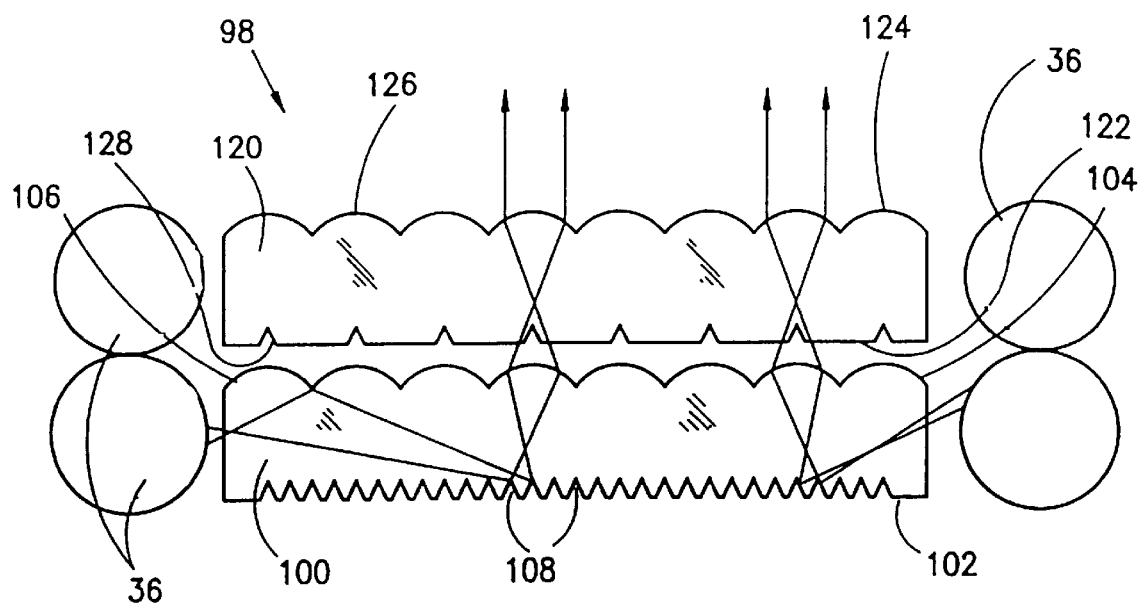
FIG. 7 illustrates the geometry and optical characteristics on one embodiment of the invention which utilizes two stacked lightguides.

In an alternative embodiment, two lightguides could be stacked together as shown generally at 98 in FIG. 7 for generating a uniform radiance. Both lightguides 100, 120 preferably would have similar surface relief containing lenticular lens arrays 106, 126 on the second surfaces 104, 124, respectively. Arrays of grooves 108, 128 would also be common to both first surfaces 102, 122, however the second additional lightguide 100 would contain densely packed grooves 108. Both sets of grooves 108, 128 would be coated with reflective films, or otherwise made to reflect light. In operation, light striking the first surface 102 of the second, stacked lightguide 100 reflects across the width of its slab. Incident the opposite surface 104 of lenticular lenses 106, this light is focused to a point inside the first lightguide 120. If this focus is close to the grooves of the first lightguide 120 then the lenticular lenses 126 of the first lightguide 120 will refocus this light into a second set of lightlines.

Figure 8:
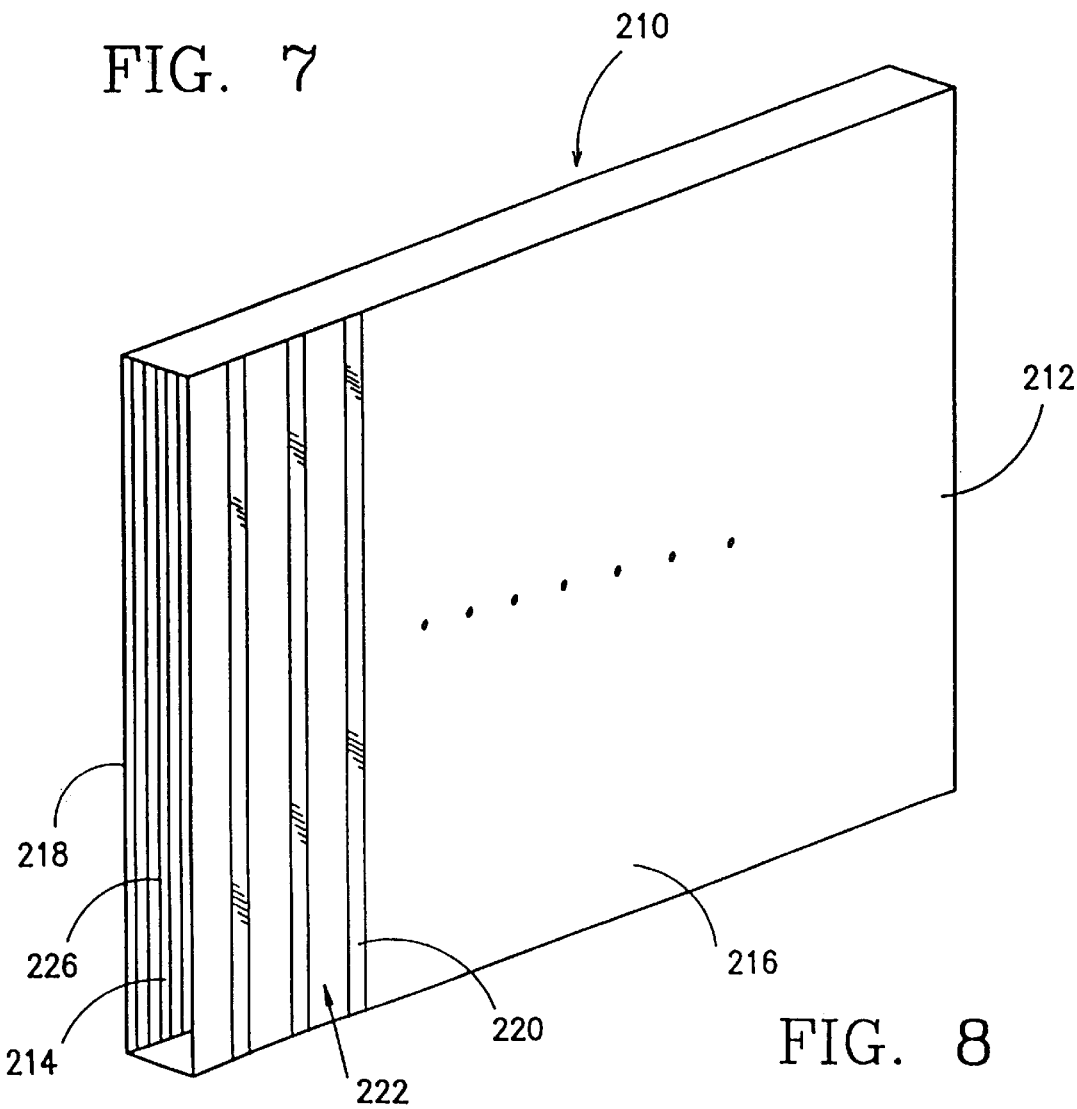
FIG. 8 illustrates a perspective view of a slab or plate in another embodiment of the invention which utilizes glossy white lines in place of reflective grooves.

FIG. 8 illustrates the lightguide in another embodiment of the present invention. The lightguide 210 may be a light transmissive, preferably clear rectangular substrate plate as shown by light transmissive slab 212. As with slab 12 in FIG. 2, the slab 212 may be made from any light transmissive material, such as glass or fused silica, or any other material known in the prior art such as plastics or any other light transmissive or at least partially light transmissive material. The slab 212 includes two edges which may be illuminated, however the slab shall include at least one illuminated edge shown generally at 214. The slab further includes two parallel opposing surfaces, a first surface 216 and a second surface 218.

The first surface 216 has a plurality of thin substantially evenly spaced glossy preferably white lines 220 across the surface of the lightguide and preferably parallel to the short dimension of the guide and the illuminated edge 214. Although only three glossy lines 220 are shown in FIG. 8, it is within this embodiment to provide glossy lines 220 across the entire first surface 216. The glossy lines 220 are made from a suitable glossy material such as glossy ink or paint and are disposed on the first surface of the lightguide in a suitable manner such as by painting, silkscreening, or printing. The glossy lines 220 are separated by spaces shown as land areas or flat surfaces 222. The glossy lines will scatter light striking them across a large angle, and an appreciable amount of light will be scattered forward through the opposite side of the lightguide towards the second surface 218. Since some light may leak through the paint or ink of the glossy lines 220, the rear surface of the glossy lines 220 may be coated with a reflective material, such as aluminum, so that any light which may leak out the rear of the lines is reflected back into the guide and toward the second surface, thus increasing efficiency. The flat surfaces 222 between the glossy lines 220 may be left light transmissive, and are not made reflective nor coated with a reflective material.

As with the light transmissive slab 12 of FIG. 2, the second surface 218 of the light transmissive slab 212 is formed with a plurality of lenticular lenses 226 as previously discussed. The lenticular lenses 226 are oriented parallel to both the glossy lines 220 and the illuminated edge 214. Thus, as with lightguide 10, lightguide 210 reflects light efficiently from linear regions of the first surface in a forward direction towards the second surface so that the light passes through lenticular lenses disposed on the second surface.

In some embodiments, it may be desirable to allow the user of the device to switch back and forth from 3-D viewing to 2-D viewing. For example, the user of a standard laptop computer employing the backlighter system of the present invention may not wish to view the flat display screen in 3-D when using a word processing program. The present invention allows for changing the screen from 2-D to 3-D by merely changing the illumination between a uniform rear illumination source for 2-D and the bright light lines for 3-D.

One preferred embodiment for enabling a user to switch back and forth from 3-D to 2-D viewing is shown in FIG. 9. A 2-D/3-D variable diffuser 60 of plastic construction is a layer of LC (Liquid Crystal) material sandwiched between two electrode layers. The LC material may be smectic, or a PDLC or PSCT layer. The diffuser 60 made of plastic is typically about 0.25 millimeters thick. The diffuser 60 is placed between the lightguide 10 (or alternatively lightguide 210), against second surface 18, and the LCD 62. The diffuser 60 lets light pass through it undisturbed when an electrical voltage is applied across the LC material, but it scatters light when the electricity is turned off. For 3-D viewing, the electric current across the LC layer is turned on, allowing the viewer to see the bright lines cast by the lightguide. For 2-D viewing, the electric current across smectic layer is turned off, so that the layer scatters the light from the lines. The observer then sees uniform illumination across diffuser 60, and sees all of the pixels in LCD 62 with both eyes, allowing the observer to comfortably see full resolution 2-D images. Alternatively, of course, the LC material may scatter light when the electricity is turned on so that 3-D viewing is enabled when the electricity is turned off. The choice could be decided by which dimensional viewing is more likely to be used than the other in a particular device.

Another preferred embodiment for enabling a user to switch back and forth from 2-D to 3-D viewing is shown in FIG. 10. A 2-D/3-D variable diffuser 70 of glass construction is a layer of LC (Liquid Crystal) material (smectic LC, PDLC, PSCT, or similar products) sandwiched between two electrode layers. Because the diffuser 70 made of glass is typically about 2.2 millimeters, the diffuser 70 is too thick to place between the lightguide 10 and LCD 62. Therefore, lightguide 72 is employed for this embodiment. Lightguide 72 will be approximately 4 millimeters thick. The lightguide 72 will have a first surface 74 and a second surface 76. The first surface 74 will be covered with grooves or glossy lines (too small to be seen in FIG. 7) preferably in the same manner as grooves 20 or glossy lines 220 are disposed on first surface 16 of lightguide 10 or first surface 216 of lightguide 210, respectively. Second surface 76 is preferably smooth and not covered with lenticular lenses. Instead, a separate layer of lenticular lenses 78 is provided. The layer of lenticular lenses has a first surface 80 and a second surface 82. The first surface 80 is preferably smooth and the second surface 82 is covered with lenticular lenses (too small to be seen in FIG. 7) preferably in the same manner as lenses 26 are disposed on second surface 18 of lightguide 10. In this embodiment, the diffuser 70 is spaced from the second surface 76 of lightguide 74 by an appropriate distance, and in a preferred embodiment by approximately 18.73 millimeters. The first surface 80 of the lenticular lens layer 78 is then placed against the diffuser 70. A gap, in a preferred embodiment being approximately 1.25 millimeters, is then provided between the second surface 82 of the lenticular lens layer 78 and the LCD 62. The diffuser 70 lets light pass through it undisturbed when an electrical voltage is applied across the LC material, but it scatters light when the electricity is turned off (or vice-versa as described above). For 3-D viewing, the electric current across the smectic LC layer is turned on, allowing the viewer to see the bright lines cast by the lightguide. For 2-D viewing, the electric current across smectic layer is turned off, so that the layer scatters the light from the lines. The observer then sees uniform illumination across diffuser 70, and sees all of the pixels in LCD 62 with both eyes, allowing the observer to comfortably see full resolution 2-D images. In the construction of a lightguide described for FIG. 10 or in some other alternate embodiments, it may be desirable to provide the first surface 74 with less and larger grooves or glossy lines since the lenticular lenses are spaced a greater distance away from the first surface than in the lightguide 10. In another embodiment, the stacked lightguides of FIG. 7 could be separated by diffuser 70 as discussed in connection with FIG. 10.

Another embodiment that allows more versatile 2-D/3-D operation is shown in FIG. 11. The single element variable diffusers 60 and 70 employed in FIGS. 9 and 10, respectively, can be replaced with the type of diffuser shown in FIG. 11. The diffuser 170 has several sections, numbered 171–186 in FIG. 11, that can be independently controlled, with each section capable of becoming diffuse or transparent independently of the others. This arrangement will work best in the configuration where the variable diffuser is situated between the lenticular lens and the transmissive display. Although sixteen sections of equal size and rectangular shape are shown, any number of sections from two to several thousand could theoretically be present. Furthermore, the sections could be of different sizes and shapes, although a rectangular or square shape would generally be the most useful. The diffuser 170 may be made from the same materials as diffusers 60 and 70, that is from liquid crystal material, chosen to scatter light or not scatter light when an electrical voltage is applied across the liquid crystal material. Electronically, however, the diffuser 170 would operate and be addressed in the same general manner as an image forming LCD would be, with each of the sections 171–186 being, in effect, a large pixel. By causing different sections, or groups of sections such as 181, 182, 185, and 186 outlined by the dotted line, to become transparent while others remain diffuse, one can cause some sections of the display to display 3-D images and some sections to display 2-D images. This is particularly useful when using a computer operating system employing windows to display different sets of information. One can drag a window and size it to cover a group of sections, turn those sections transparent, and display a 3-D image in the window while the rest of the display shows a full resolution 2-D image or 2-D field of text, data, or symbols. Ideally computer software can be programmed to generate windows in the correct location to cover certain sections, and turn those sections clear or transparent depending on what type of information is being displayed in the windows.

Figure 12:
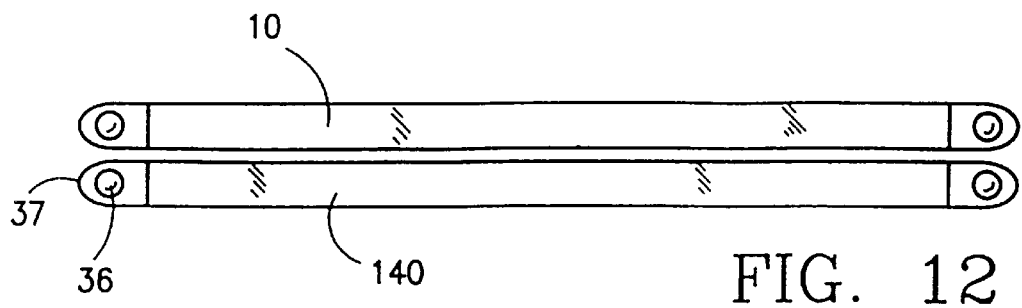
FIG. 12 illustrates a top view of another alternate embodiment for illuminating three dimensional displays of the present invention with the possibility of alternating back and forth between 3-D and 2-D displays.

Another preferred embodiment for enabling a user to switch back and forth from 2-D to 3-D viewing is shown in FIG. 12. Adjacent and parallel to lightguide 10, or alternatively lightguide 210, is a standard 2-D lightguide 140 used in 2-D applications, such as is commonly used for LCD illumination in laptop computers and similar devices. Contrary to 3-D lightguide 10 and 210, 2-D lightguide 140 is not provided with a means for reflecting light from linear regions and focusing it into a plurality of discrete, spaced apart, elongated light lines separated by dark spaces. Both the 3-D lightguide 10 and the 2-D lightguide 140 are provided with at least one light source 36 generally coplanar with their respective guides, and are preferably each provided with two light sources 36, one on each end of each lightguide. Preferably, each light source used is provided with a reflector 37 so that light from the light sources 36 may be directed towards the edges of their respective lightguides. The reflectors 37 are preferably coplanar with the lightguides so as not to enlarge the thickness of the backlighting system of the present invention. The reflectors may, for example, comprise reflecting tape or reflective generally U-shaped channels. To switch from 3-D to 2-D viewing, the light source or light sources 36 coplanar with the 3-D lightguide are turned off and the light source or light sources 36 coplanar with the 2-D lightguide are turned on. Likewise, to switch from 2-D to 3-D viewing, the light source or light sources 36 coplanar with the 2-D lightguide are turned off and the light source or light sources 36 coplanar with the 3-D lightguide are turned on. In order to effectively accommodate 3-D viewing, the 2-D lightguide is positioned behind the 3-D lightguide so that the 3-D lightguide is located between the 2-D lightguide and the transmissive display 62 shown in FIG. 1. In general, blockage of light by the reflective linear regions (grooves 20 or glossy lines 220) will not introduce sufficient unevenness to light passing through from the 2-D lightguide to be noticeable to the viewer. The width of the reflective linear regions will typically be less than 25% of the width of the land areas between them.

Figure 13A:
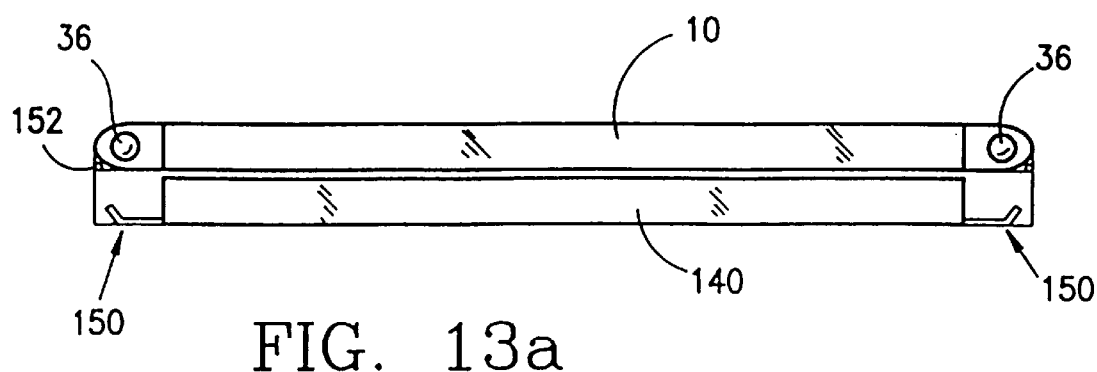
FIGS. 13A–13C illustrate top views of another alternate embodiment for illuminating three dimensional displays of the present invention with the possibility of alternating back and forth between 3-D and 2-D displays.
Figure 13B:
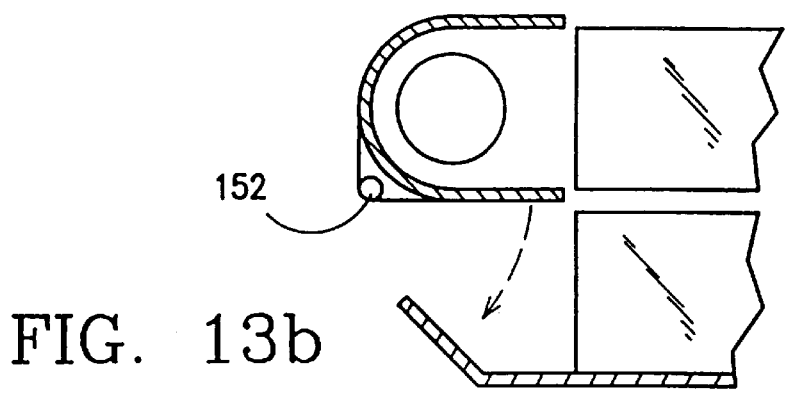
Figure 13C:
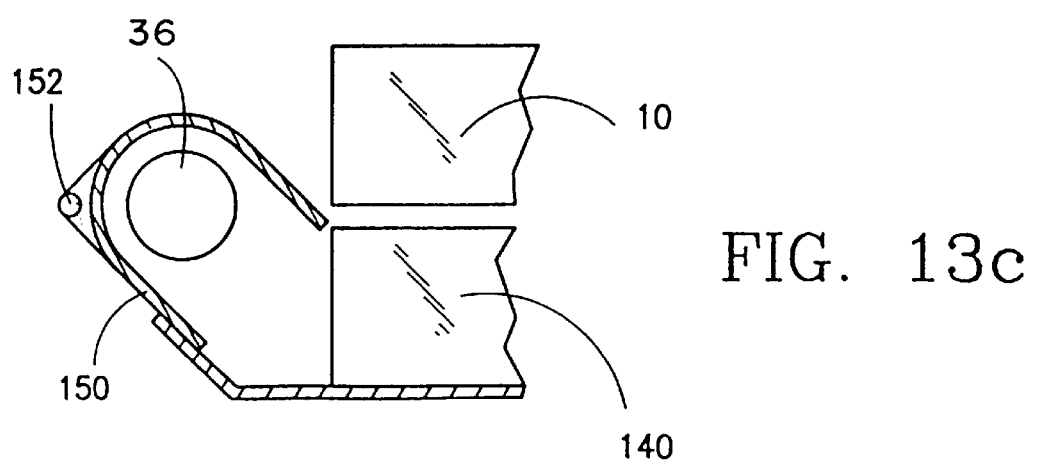

FIGS. 13A–13C show a modified version of the embodiment for enabling a user to switch back and forth from 2-D to 3-D viewing shown in FIG. 12. In this embodiment, no more than one set of light sources 36 is employed. Preferably, at least one light source 36 is positioned coplanar with the 3-D lightguide 10, or alternatively 210, as shown in FIG. 13A. Instead of using a stationary reflector, such as reflector 37 shown in FIG. 12, a movable mirror arrangement, shown generally as 150, is employed. The mirror arrangement 150 is movable between an open position and a closed position. The movement can be effected by positioning the mirror arrangement on a hinge 152. In the closed position, the mirror arrangement is flipped up so that light from the light source 36 is directed only towards the 3-D lightguide, as shown in FIG. 13B. Therefore, when 3-D viewing is desired, the mirror arrangement can be activated, as by electronic control, to be in the closed position. When the mirror arrangement 150 is flipped down at approximately a forty-five degree angle so as to be in an "open" position, as shown in FIG. 13C, light is reflected down into the 2-D lightguide. Therefore, when 2-D viewing is desired, the mirror arrangement can be activated to be in the open position.

The foregoing configurations and methods have been described in the foregoing specification for the purpose of illustration and not limitation. Many other modifications and ramifications will naturally suggest themselves to those skilled in the art based on this disclosure. These are intended to be comprehended as within the scope of this invention.

We claim:

1. A lightguide for a three dimensional autostereoscopic display comprising a light transmissive slab having at least one illuminated edge; a first surface; a second surface; a plurality of elongated, reflective linear regions formed in the first surface, the linear regions being generally parallel to the illuminated edge, and spaced apart by a distance at least twice their width; each linear region having at least one elongated reflecting surface for reflecting light onto the second surface; and means for focusing the reflected light into a plurality of discrete, spaced apart, elongated light lines separated by dark spaces.

2. The lightguide as claimed in claim 1 wherein the means for focusing the reflected light into a plurality of discrete, spaced apart, elongated light lines separated by dark spaces comprises an array of lenticular lenses on the second surface for focusing light reflected by each of the at least one reflecting surface into a plurality of light lines.

3. The lightguide of claim 1 wherein the plurality of elongated, reflective linear regions are grooves and each groove has left and right elongated reflecting surfaces.

4. The lightguide as claimed in claim 3 wherein the reflecting surfaces of the grooves in a central area of the first surface are of equal widths.

5. The lightguide as claimed in claim 3 wherein left reflecting surfaces of the grooves in a left-side area of the first surface are wider than right reflecting surfaces of the grooves in a left-side area of the first surface.

6. The lightguide as claimed in claim 3 wherein right reflecting surfaces of the grooves in a right-side area of the first surface are wider than left reflecting surfaces of the grooves in a right-side area of the first surface.

7. The lightguide as claimed in claim 3 wherein the reflecting surfaces of the grooves are curved.

8. The lightguide as claimed in claim 3 wherein the reflecting surfaces of the grooves are planar.

9. The lightguide as claimed in claim 1 wherein the slab is made from a material selected from the group consisting of glass, fused silica, acrylic, or plastic.

10. The lightguide as claimed in claim 1 wherein the reflective linear regions are coated with a reflecting material.

11. The lightguide as claimed in claim 3 wherein the reflecting surfaces of the grooves are rough.

12. The lightguide as claimed in claim 3 wherein the slab has a right and a left illuminated edge parallel to the grooves, wherein each of the grooves has a constant depth throughout its length, and wherein the depth of the grooves steadily and gradually increases from the right and left edges of the first surface to a maximum depth of the grooves in a central area of the first surface for providing an even distribution of light onto the second surface.

13. The lightguide as claimed in claim 1 wherein the linear regions are spaced apart from one center of a linear region to another center of an adjacent linear region by a distance of at least five times their average width.

14. The lightguide as claimed in claim 1 wherein the surface area of the first surface between the linear regions is planar and is not coated with a reflective material.

15. The lightguide as claimed in claim 2 wherein the lenticular lenses are oriented parallel to both the linear regions and the illuminated edge.

16. The lightguide as claimed in claim 2 wherein there are more lenticular lenses on the second surface than there are linear regions on the first surface.

17. The lightguide as claimed in claim 2 wherein the width and depth of the lenticular lenses are substantially constant throughout the second surface.

18. The lightguide as claimed in claim 1 wherein the thickness of the slab is between 3.0 and 4.0 mm.

19. The lightguide as claimed in claim 1 wherein the first surface is substantially planar and the plurality of elongated, reflective linear regions are glossy lines and each glossy line has one elongated reflecting surface.

20. The lightguide as claimed in claim 19 wherein the glossy lines are substantially white.

21. The lightguide as claimed in claim 19 wherein the glossy lines are made from a material selected from the group consisting of paint and ink.

22. The lightguide as claimed in claim 19 wherein a rear surface of the glossy lines are coated with a reflecting material for reflecting any light which leaks through the lines.

23. A 2-D/3-D backlighter for illuminating the back side of flat panel displays comprising:

at least one light source which emits light;

a 3-D lightguide, positioned adjacent the at least one light source and generally coplanar with the at least one light source, wherein the 3-D lightguide has means for directing light, emitted from the at least one light source, into a series of thin vertical lines; and, means for allowing either 3-D viewing or 2-D viewing.

24. The 2-D/3-D backlighter of claim 23 wherein the means for allowing either 3-D viewing or 2-D viewing is a diffuser plate having at least one section which is transparent when 3-D viewing is desired and diffuse when 2-D viewing is desired.

25. The 2-D/3-D backlighter of claim 24 wherein the diffuser plate is a layer of liquid crystal material that scatters light when no electricity is placed across it, and does not scatter light significantly when voltage is placed across it.

26. The 2-D/3-D backlighter of claim 23 wherein the means for allowing either 3-D viewing or 2-D viewing is a 2-D lightguide positioned parallel to the 3-D lightguide.

27. The 2-D/3-D backlighter of claim 26 wherein the backlighter has at least two light sources, wherein at least one light source is generally coplanar with the 3-D lightguide and is turned off when 2-D viewing is desired, and wherein at least one light source is generally coplanar with the 2-D lightguide and is turned off when 3-D viewing is desired.

28. The 2-D/3-D backlighter of claim 26 further comprising a mirror, movable between an open position and a closed position, the mirror positioned adjacent the at least one light source, wherein the mirror directs light from the at least one light source into the 3-D lightguide when in the closed position when 3-D viewing is desired and directs light from the at least one light source into the 2-D lightguide when in the open position when 2-D viewing is desired.

29. A display system comprising, in combination:

at least one light source which emits light;

a lightguide, positioned coplanar with the light source, having at least one illuminated edge parallel to the light source, the lightguide further having first and second parallel surfaces wherein the first surface is provided with a plurality of elongated reflective spaced apart linear regions generally parallel to the illuminated edge;

means for focusing light reflected from the linear regions into a plurality of discrete, spaced apart elongated light lines separated by dark spaces; and, a light transmissive display screen, parallel to the lightguide, for viewing the display.

30. A display system as claimed in claim 29 further comprising, in combination, a 2-D diffuser plate, positioned between and parallel to the lightguide and the light transmissive display, wherein the plate has at least one section which is transparent when 3-D viewing is desired and diffuse when 2-D viewing is desired.

31. A display system as claimed in claim 30 wherein the means for focusing light is positioned on the second surface of the lightguide and comprises a plurality of lenticular lenses substantially parallel to the linear regions.

32. A display system as claimed in claim 30 wherein the means for focusing light comprises a layer of lenticular lenses wherein the 2-D diffuser plate is positioned between the lightguide and the layer of lenticular lenses.

33. A display system as claimed in claim 29 wherein the means for focusing light is positioned on the second surface of the lightguide and comprises a plurality of lenticular lenses substantially parallel to the linear regions.

34. The lightguide as claimed in claim 1, for a 2-D/3-D display, in combination with at least one light source which emits light and means for allowing either 3-D viewing or 2-D viewing.

35. The lightguide as claimed in claim 34, for a 2-D/3-D display, wherein the means for allowing either 3-D viewing or 2-D viewing is a diffuser plate having at least one section which is transparent when 3-D viewing is desired and diffuse when 2-D viewing is desired.

36. The lightguide as claimed in claim 35, for a 2-D/3-D display, wherein the diffuser plate is a layer of liquid crystal material that scatters light when no electricity is placed across it, and does not scatter light significantly when voltage is placed across it.

37. The lightguide as claimed in claim 34, for a 2-D/3-D display, wherein the lightguide is a 3-D lightguide and the means for allowing either 3-D viewing or 2-D viewing is a 2-D lightguide positioned parallel to the 3-D lightguide.

38. The lightguide as claimed in claim 37, for a 2-D/3-D display, wherein the combination has at least two light sources, at least one light source being generally coplanar with the 3-D lightguide and turned off when 2-D viewing is desired, and at least one light source being generally coplanar with the 2-D lightguide and turned off when 3-D viewing is desired.

39. The lightguide as claimed in claim 37, for a 2-D/3-D display, further comprising a mirror, movable between an open position and a closed position, the mirror positioned adjacent the at least one light source, wherein the mirror directs light from the at least one light source into the 3-D lightguide when in the closed position when 3-D viewing is desired and directs light from the at least one light source into the 2-D lightguide when in the open position when 2-D viewing is desired.

40. The lightguide as claimed in claim 35, for a 2-D/3-D display, wherein the diffuser plate has a plurality of sections, each section capable of becoming transparent or diffuse independent of the other sections.

41. The 2-D/3-D backlighter of claim 24 wherein the diffuser plate has a plurality of sections, each section capable of becoming transparent or diffuse independent of the other sections.

42. A display system as claimed in claim 30 wherein the diffuser plate has a plurality of sections, each section capable of becoming transparent or diffuse independent of the other sections.

43. A display system as claimed in claim 29 wherein the lightguide is a 3-D lightguide and further comprising, in combination, a 2-D lightguide, positioned parallel to the 3-D lightguide, wherein the 2-D lightguide is illuminated when 2-D viewing is desired.

44. The lightguide as claimed in claim 7 wherein each reflecting surface of the left and right elongated reflecting surfaces is multi-faceted.

45. The lightguide as claimed in claim 8 wherein each reflecting surface of the left and right elongated reflecting surfaces is multi-faceted.

* * * * *